United States Patent
Lille

(10) Patent No.: US 7,200,918 B2
(45) Date of Patent: Apr. 10, 2007

(54) METHOD FOR FORMING AN AIR BEARING SURFACE ON A SLIDER

(75) Inventor: Jeffrey S. Lille, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 225 days.

(21) Appl. No.: 10/601,982

(22) Filed: Jun. 20, 2003

(65) Prior Publication Data

US 2004/0016106 A1    Jan. 29, 2004

Related U.S. Application Data

(62) Division of application No. 09/378,059, filed on Aug. 20, 1999, now Pat. No. 6,683,753.

(51) Int. Cl.
*G11B 5/127* (2006.01)
*H04R 31/00* (2006.01)

(52) U.S. Cl. ............... 29/603.12; 29/603.11; 29/603.13; 29/603.14; 29/603.15; 29/603.16; 29/603.18; 29/417; 216/39; 216/65; 360/235.4; 360/234.3; 360/236.5; 360/294.7; 427/127; 427/128; 451/5; 451/41

(58) Field of Classification Search ............ 29/603.07, 29/603.11, 603.13–603.17, 417; 360/235.4, 360/234.3, 236.5, 294.7, 234, 294; 216/39, 216/65; 451/5, 41
See application file for complete search history.

(56) References Cited

U.S. PATENT DOCUMENTS

| | | | | |
|---|---|---|---|---|
| 5,177,860 A | * | 1/1993 | Yura et al. ............... | 29/603.07 |
| 5,327,310 A | * | 7/1994 | Bischoff et al. ......... | 360/237.1 |
| 5,587,857 A | * | 12/1996 | Voldman et al. ......... | 360/234.4 |
| 5,708,540 A | * | 1/1998 | Ananth et al. ........... | 360/235.4 |
| 5,781,376 A | * | 7/1998 | Tsukamoto ............... | 360/235.1 |

FOREIGN PATENT DOCUMENTS

JP    59185014 A    * 10/1984

OTHER PUBLICATIONS

"Ultrasonic linear motor using surface acoustic waves"; Kurosawa, M.; Takahashi, M.; Higuchi, T.; Ultrasonics, Ferroelectrics and Frequency Control, IEEE Transactions on, vol. 43, Issue: 5, Sep. 1996; pp. 901-906.*

* cited by examiner

*Primary Examiner*—Paul D. Kim
(74) *Attorney, Agent, or Firm*—Konrad Raynes & Victor, LLP; Alan S. Raynes

(57) ABSTRACT

Embodiments include a slider having a silicon body and at least one carbide pad structure embedded therein. At least one head structure for reading and/or writing data is located on the silicon body. The silicon body includes an air bearing surface on which the head is located. The air bearing surface also includes at least a portion of the carbide pad structure thereon. In one aspect, the metal carbide structure may be made from a material such as titanium carbide, zirconium carbide, vanadium carbide, tungsten carbide, or molybdenum carbide. In another aspect, the head may be located on the air bearing surface between carbide pad structures.

11 Claims, 6 Drawing Sheets

METHOD FOR FORMING AN AIR BEARING SURFACE ON A SLIDER

This application is a divisional of U.S. application Ser. No. 09/378,059, filed Aug. 20, 1999, now U.S. Pat. No. 6,683,753, which is hereby incorporated by reference in its entirety.

FIELD OF THE INVENTION

Embodiments of the present invention relate generally to disk drive systems and to read/write elements and slider devices within the systems.

DESCRIPTION OF RELATED ART

Magnetic storage systems typically include a rotatable magnetic disk having concentric data tracks defined for storing data, and a magnetic recording head or transducer for reading data from and writing data to the various data tracks. In typical disk drive systems, a stack of one or more magnetic disks is mounted over a spindle on a drive motor. The system also includes a head actuator for moving the magnetic recording head relative to the disk surfaces, and electronic circuitry for processing signals to implement various functions of the disk drive.

The head is attached to a carrier or slider having an air bearing surface which is supported during operation adjacent to the data surface of the disk by a cushion of air generated by the rotating disk. The terms "head" and "slider" are sometimes both used to refer to the slider having a head attached thereon. The slider design affects the efficiency, density, speed and accuracy with which the data can be read and written to the disk. Recording density generally depends on the separation distance between the recording element of the head and the disk. As a result, lower flying heights are usually desired to achieve high areal density recording. Lower flying heights, however, can lead to undesirable interactions between the head and the disk.

As the disk generally includes a hard carbon coating, the slider is typically fabricated from a hard ceramic material so that any interactions between the disk and air bearing surface of the slider will not result in premature wear or breakage of the slider. In addition, the slider material should be relatively inert so that no chemical reactions take place on the air bearing surface. As illustrated in FIG. 1, sliders are usually derived from a wafer 100 made from a ceramic material such as a mixture of aluminum oxide ($Al_2O_3$) and titanium carbide (TiC). The components of each read/write device are formed or deposited on a surface 12 of the wafer 10 and the wafer 10 is diced into rows such as row 20 illustrated in FIG. 2. The row 20 has an end surface 12 having the read/write device and a row face that is processed, usually by polishing and/or etching, to form an air bearing surface 22. The row 20 is then diced into individual sliders 30 having an air bearing surface 22 and a read/write device surface 12 on which the read/write device is preferably located at a central position 32, as illustrated in FIG. 3.

Fabricating a slider from silicon presents problems because silicon is relatively soft when compared with slider materials such as $Al_2O_3$/TiC. This can lead to durability problems. In addition, silicon displays undesirable start/stop behavior on a disk when compared with other materials.

SUMMARY

Preferred embodiments of the present invention relate to disk drive systems and components therein, including sliders and read/write elements thereon.

One embodiment includes a slider structure including a silicon body having an air bearing surface. The air bearing surface includes a silicon surface region and a metal carbide surface region. The metal carbide surface region is a part of a metal carbide structure embedded in the silicon body.

Another embodiment includes a slider having a silicon body and at least one pad structure embedded therein. At least one head structure for reading and/or writing data is located on the silicon body. The silicon body includes an air bearing surface on which the head is located. The air bearing surface also includes at least a portion of the pad structure thereon.

Still another embodiment includes a disk drive for reading and writing disks. The disk drive includes at least one disk and a read/write head associated with the surface of the disk. The disk drive includes a slider onto which the read/write head is provided. The slider includes a silicon body and an air bearing surface on the silicon body. The air bearing surface includes a silicon surface region and a metal carbide surface region, with the metal carbide surface including a portion of the at least one carbide structure embedded in the silicon body. The disk drive also includes an actuator for supporting the slider and positioning the head across the disk, as well as a rotatable hub for mounting the disk.

Embodiments also relate to methods for forming an air bearing surface on a slider. One such embodiment includes providing a silicon slider body and forming at least one trench on a portion of one side of the silicon body. A carbide or nitride structure is formed in the trench. Preferably the air bearing surface includes both a portion of the silicon body and a portion of the carbide structure. Certain embodiments may also include forming at least one of a read element and a write element on the air bearing surface after forming the carbide or nitride structure.

In one aspect of certain embodiments, a carbide structure may be formed by a process including filling the trench with a metal carbide and anhydrous metal chloride material and heating the material to produce a melt. The material is then cooled and the chloride material formed from the melt is removed. Preferably the remaining carbide material is then planarized.

Still another embodiment relates to a method for forming a slider including forming at least one trench into a silicon body and forming an air bearing surface pad structure in the trench that extends to a position at or above the silicon body. A read/write head is then formed on the silicon body after forming the air bearing surface pad structure.

BRIEF DESCRIPTION OF THE DRAWINGS

Embodiments of the invention are described with reference to the accompanying drawings which, for illustrative purposes, are schematic and not necessarily drawn to scale.

DETAILED DESCRIPTION

Preferred embodiments of the present invention are described with reference to FIGS. 4–13. While the invention is described in terms of the best mode for achieving this invention's objectives, it will be appreciated by those skilled in the art that variations may be accomplished in view of these teachings without deviating from the spirit or scope of the invention.

Formation of silicon based sliders for read/write heads for recording applications has not been favored because single crystal silicon has a lower hardness and less resistance to chipping than other materials such as aluminum oxide/ titanium carbide. The hardness and resistance to chipping are important in the regime of near contact recording, for durability purposes. Certain preferred embodiments of the present invention relate to processes and structures which may relate to a silicon slider including at least one hard carbide pad embedded in a portion of the silicon slider air bearing surface prior to forming the read/write head element on the air bearing surface of the slider.

Preferred structures provide numerous advantages including the ability to efficiently produce advanced read/write structures after forming the air bearing surface. This means that the processing steps used for forming the air bearing surface which may, for example, include elevated temperatures, will not effect the read/write structure. By forming the read/write head element on the air bearing surface, preferred embodiments also provide the ability to precisely control the height of the read/write head elements, which permits the elements to be spaced very close to the surface of a disk during operation.

Figure 1:
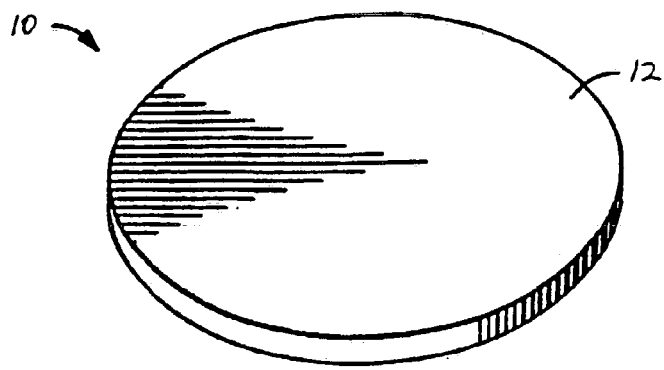
FIG. 1 is a perspective view of a wafer from which a plurality of sliders may be manufactured.
Figure 2:
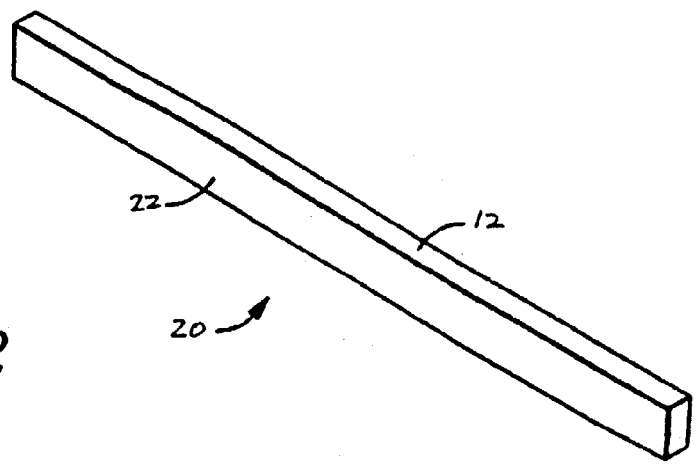
FIG. 2 is a perspective view of a row cut from the wafer of FIG. 1 during slider manufacturing.
Figure 3:
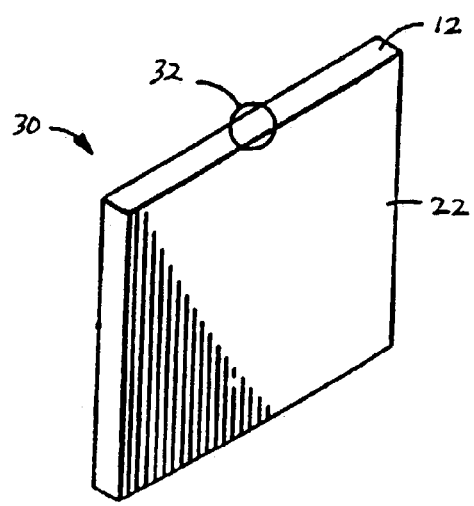
FIG. 3 is a perspective view of an individual slider component diced from the row of FIG. 2.
Figure 4:
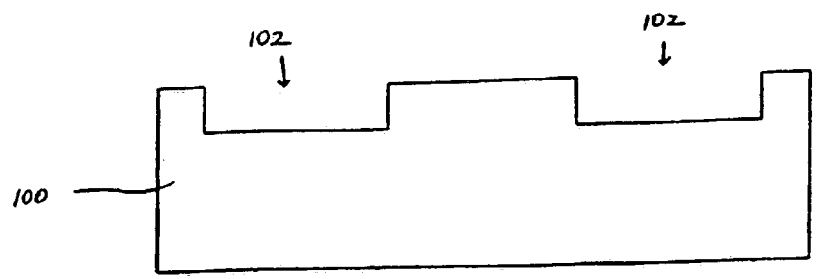
FIGS. 4–8 represent processing steps in the manufacturing of a slider according to certain embodiments of the present invention.
Figure 5:
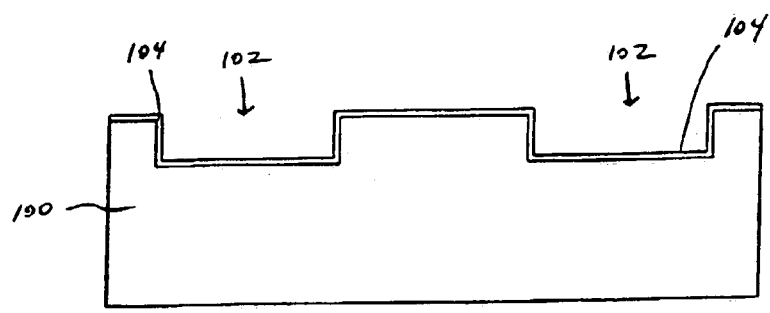
Figure 6:
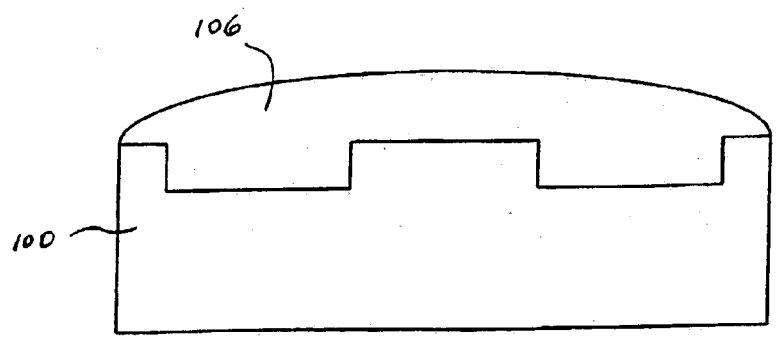
Figure 7:
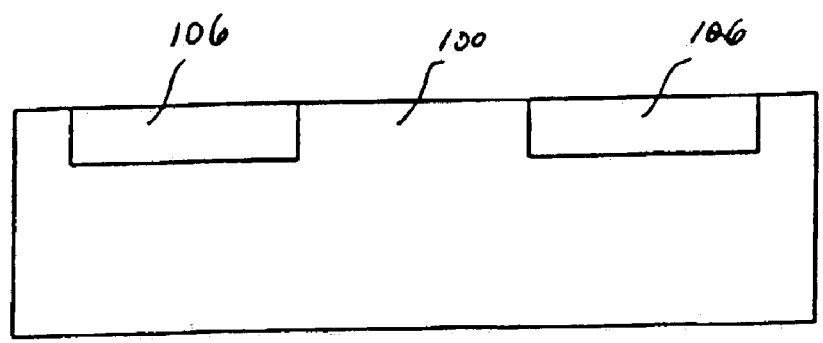

Processing steps according to one embodiment of the present invention are described below with reference to FIGS. 4–8. A silicon wafer or substrate 100 may be masked and etched as known in the art to form one or more trenches or openings 102 in the surface of the substrate 100, as illustrated in FIG. 4. If desired, an optional layer 104 of, for example, a material including titanium, may be deposited over all or a portion of the silicon substrate 100. The layer 100 may act as an adhesive and/or barrier layer between the silicon and the layer 106 to be deposited in the openings 102 between the layer 106 and the silicon substrate 100. (FIG. 5) A layer 106 including the metal carbide precursor materials is formed over the silicon substrate 100 and within the openings 102.

In one embodiment, an anhydrous metal chloride is used to create the carbide layer 106 through an interaction with a metal carbide which may include, for example, calcium carbide and/or aluminum carbide. The metal carbide precursor layer 106 may be deposited using a technique such as, but not limited, to physical vapor deposition (PVD), plasma enhanced chemical vapor deposition (PECVD), or a spray deposition technique. The metal carbide precursor layer 106 is then heated to a temperature sufficient to produce a melt (for example, at least 450° C.). The heating cycle may be very short, for example, in certain embodiments, less than one minute. The heating may take place at atmospheric or vacuum pressure. A short anneal step at higher temperature may also be optionally included to insure the reaction is complete. The wafer including the layer 106 is then cooled and the layer 106 includes a material including the reacted products of a metal carbide and a metal chloride region. After cooling, the surface may be rinsed with water and methanol to remove the calcium chloride. In certain embodiments the annealing may be carried out at about 800° C. to about 1000° C. for a time of up to about 48 hours.

Figure 8:
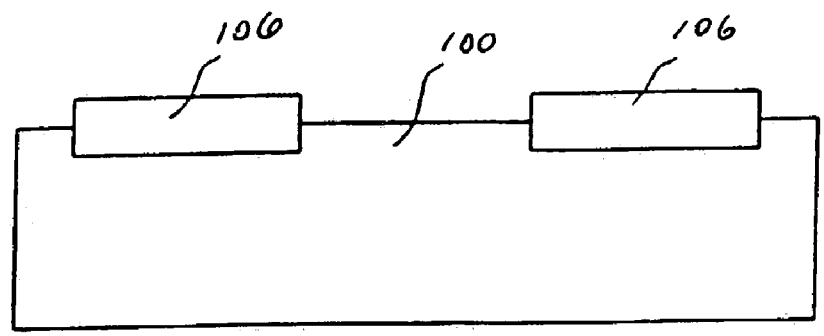

After the carbide layer 106 is formed, an etch back and/or polishing step may be carried out to planarize the carbide as desired. In certain embodiments, the carbide is planarized to the same level with the silicon (FIG. 7) and then the non-air bearing surface pad areas etched to a predetermined depth so that the carbide layer regions 106 remaining are raised above the level of the silicon 100, as illustrated in FIG. 8. These raised carbide layer regions 106 may serve as the rails of the air bearing surface of the slider during operation. The desired read/write structure is preferably formed in or on the silicon substrate 100 between the raised carbide layer regions 106. In alternative embodiments, the carbide layer regions may be processed to be at any desired level. Processing methods by which the carbide layer height can be controlled include, for example, polishing, etching, and ion milling.

FIGS. 9–12 illustrate several views of a slider 200 according to certain embodiments of the present invention having a plurality of carbide structures such as pads 202 embedded in the silicon substrate 201. The pads 202 may in certain embodiments be formed from a process such as that described above in conjunction with FIGS. 4–8 or may be formed by other processes such as, but not limited to a physical vapor deposition or chemical vapor deposition (CVD) method that does not require a melt step as described above.

Figure 9:
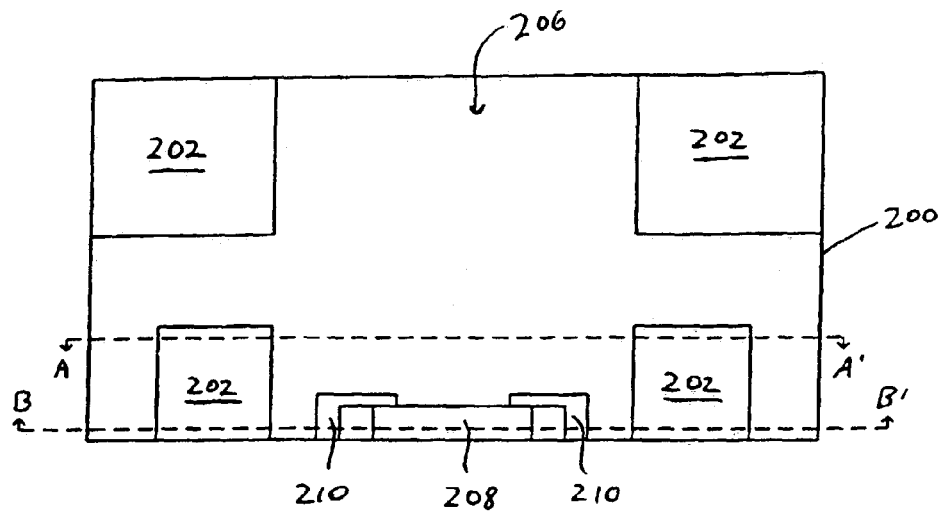
FIG. 9 illustrates a top view of an air bearing surface of a slider according to an embodiment of the present invention.
Figure 10:
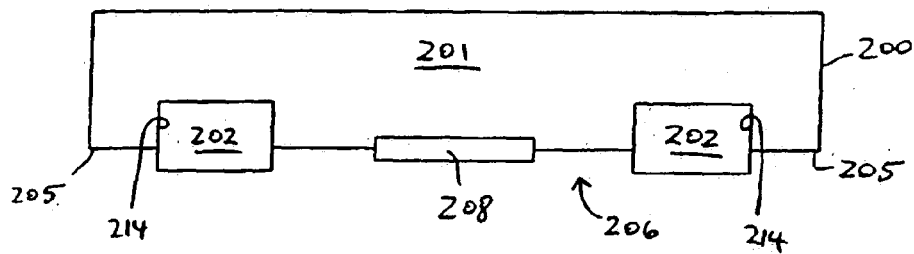
FIG. 10 illustrates a side cross-sectional view of the slider of FIG. 8 along the line A–A'.
Figure 11:
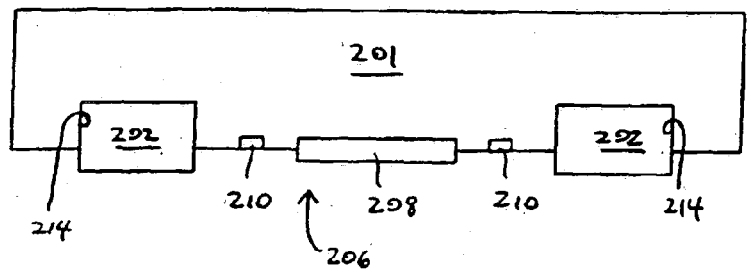
FIG. 11 illustrates a side cross-sectional view of the slider of FIG. 8 along the line B–B'.
Figure 12:
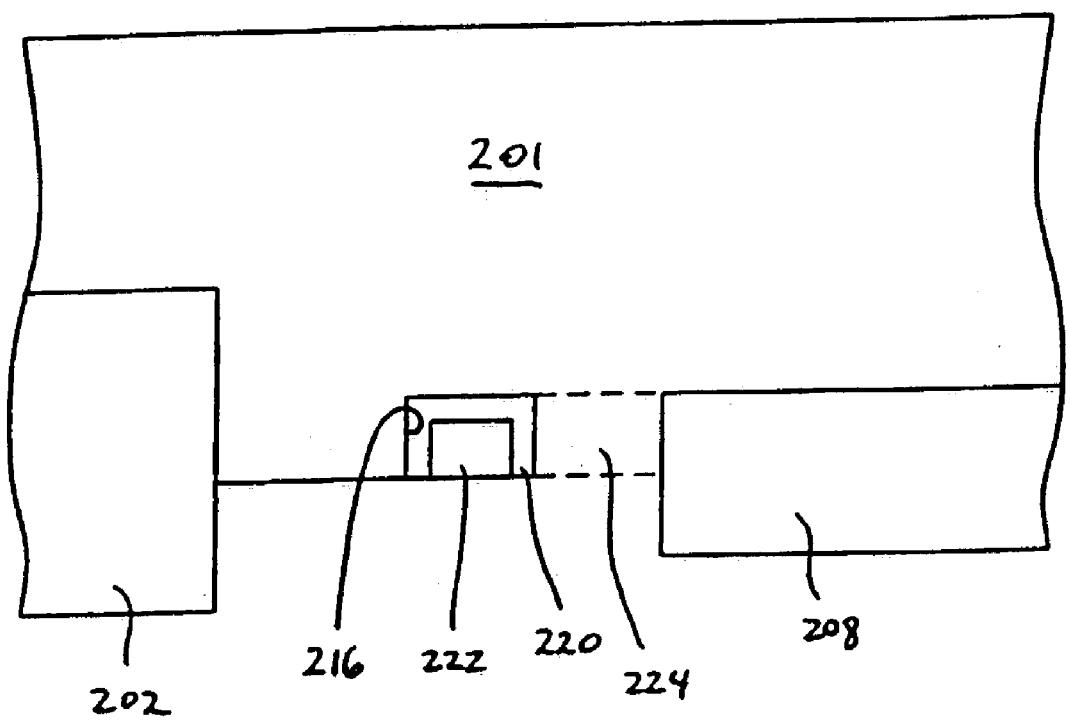
FIG. 12 illustrates a magnified view of a portion of the side cross-sectional view of the slider of FIG. 11.

FIG. 9 is a top view of the air bearing surface 206 of the slider 200 showing the relative locations of a plurality of carbide pads 202, a read/write device 208 and electrical wire connects 210. FIG. 10 is a side cross-sectional view of the slider 200 along the line A–A'. FIG. 11 is a side cross-sectional view of the slider 200 along the line B–B'. FIG. 12 is a magnified view of a portion of the slider 200 of FIG. 11.

The slider includes openings or trenches 214 into which the carbide pad structures 202 are disposed. The air bearing surface 206 may include a plurality of carbide pads 202 that are substantially rectangular in shape when viewed from above the air bearing surface. The carbide pads (and the trenches) may be formed into any desired shape. In addition, the air bearing surface may alternatively include a single pad if desired. The size, shape, and number of pads may depend on a variety of factors, including the flight characteristics of the slider and the position of the read/write device thereon. The terms "read/write device," "read/write head," "read/write structure" and "head" as used herein may refer to a structure including, but not limited to one or more read elements, one or more write elements, or a combination of read and write elements.

FIG. 9 also illustrates the relative locations of the read/write device 208 and the electrical wire connects 210 according to one preferred embodiment. The read/write device is preferably formed on the silicon air bearing surface 206 between carbide pads 202 at a position equal to or below the height of the carbide pads 202. Electrical connections to the read/write device may be made by forming trenches or grooves 216 into which the electrical wire interconnects 210 are formed. The dashed line area 224 in FIG. 12 illustrates a portion of a trench 216 through which the interconnect 210 extends to contact the read/write device 208. The interconnect region 210 illustrated in FIGS. 9–11 may be made up of a conducting: layer 222 and an insulating layer 220 separating the conducting layer from the silicon slider material. The trench 216 may be formed by masking and etching the substrate 201 and may in certain embodiments be lined with an electrically insulating material 220 such as, for example, $SiO_2$, followed by a conducting layer 222. The conducting layer 222 may be formed from a variety of materials such as, for example, aluminum, copper, or alloys including aluminum and/or copper. If the conducting layer 222 overfills the trench 216, a method such as a masking and etching operation may be used to remove the overfilled material. This may be necessary because a damascene polishing step would be difficult to perform due to the carbide pads 202, which, as illustrated in FIGS. 10–12, are preferably raised above the silicon substrate 201 surface. Alternatively the electrical interconnects 210 may be made on or above the surface of the substrate 201. The electrical interconnects 210 may preferably extend to an end of the air bearing surface 206 as illustrated in FIG. 9.

Certain preferred embodiments include two sets of trenches, such as, for example, the trenches 214 and 216. The trenches may be formed at the same time if desired. One set of trenches 214 may include an adhesion or barrier layer therein between the silicon and the carbide pad 202. The other set of trenches 216 may include an insulating layer 220 between the silicon and the conductive layer 222. Any overfill of material from the trenches may be removed simultaneously if desired, using a method such as polishing. Once the air bearing surface pads are planarized, the non-air bearing surface pad areas may be etched or milled down below the air bearing surface. Further processing may then proceed on the recessed silicon surface.

If desired, a coating layer such as a hard carbon or a polymer may be deposited over at least a portion of the air bearing surface. Such a layer may in certain embodiments be deposited near the edges 205 of the air bearing surface to protect the slider from damage.

Embodiments of the present invention provide numerous advantages over other slider structures. Typically, the read/write structure is formed first and then the air bearing surface is formed. The air bearing surface formation may include steps such as depositing a layer over the air bearing surface and etching and/or polishing the air bearing surface. These steps may use elevated temperatures and/or chemicals which can harm the read/write head structure. By forming the air bearing surface first and then forming the read/write structure, as in certain preferred embodiments of the present invention, the air bearing surface processing steps will not affect the read/write structure.

In addition, forming the slider from silicon permits a variety of read/write device structures and circuitry to be formed directly on or in the slider material, thus simplifying the process. Advanced read/write structures such as those having an AFM (atomic force microscopy) tip, or other fine, fragile structures can be formed on the air bearing surface without risk of a later processing step that requires processing conditions that might degrade the read/write device structure. A wide variety of read/write structures may be used in embodiments of the present invention. Other types read/write structures which may be utilized include, but are not limited to magnetic tunnel junction structures, thin film structures, magneto-restrictive (MR) structures, and giant magneto-resistive (GMR) structures.

Furthermore, the carbide pads and read/write structure can be formed to minimize the distance of the read/write structure from the disk during operation. In certain preferred embodiments the read/write structure is formed on the air bearing surface, which permits it to be located at a height so that it can be brought very close to the disk surface during operation. This is important because to achieve high resolution, the read/write structure should generally be very close to the disk. Mass producing a read/write structure, in which the structure is very close to the disk, is difficult using conventional read/write head and slider edge type configurations due to difficulties in dicing and handling the individual sliders precisely. By forming the read/write structure on the air bearing surface according to certain preferred embodiments of the present invention, a lower level of dicing precision is necessary, thus enabling a higher production yield.

As illustrated in FIGS. 9–11, the read/write structure may be formed between the carbide pads on the air bearing surface. Alternatively the read/write structure may be located at another location on the slider such as, for example, the trailing edge.

In another aspect of embodiments of the present invention, a variety of materials may be used as pad structures within the air bearing surface of a slider. Some preferred materials include metal carbides such as titanium carbide, zirconium carbide, vanadium carbide, tungsten carbide and molybdenum carbide. More specifically, these carbides may include TiC, ZrC, $V_8C_7$, WC, and $Mo_2C$. Other carbides may also be used, preferably other than silicon carbide (SiC) and those having a hardness greater than that of SiC. Certain embodiments may also utilize other materials such as nitrides, for example, aluminum nitride (AlN) as a pad material.

Figure 13:
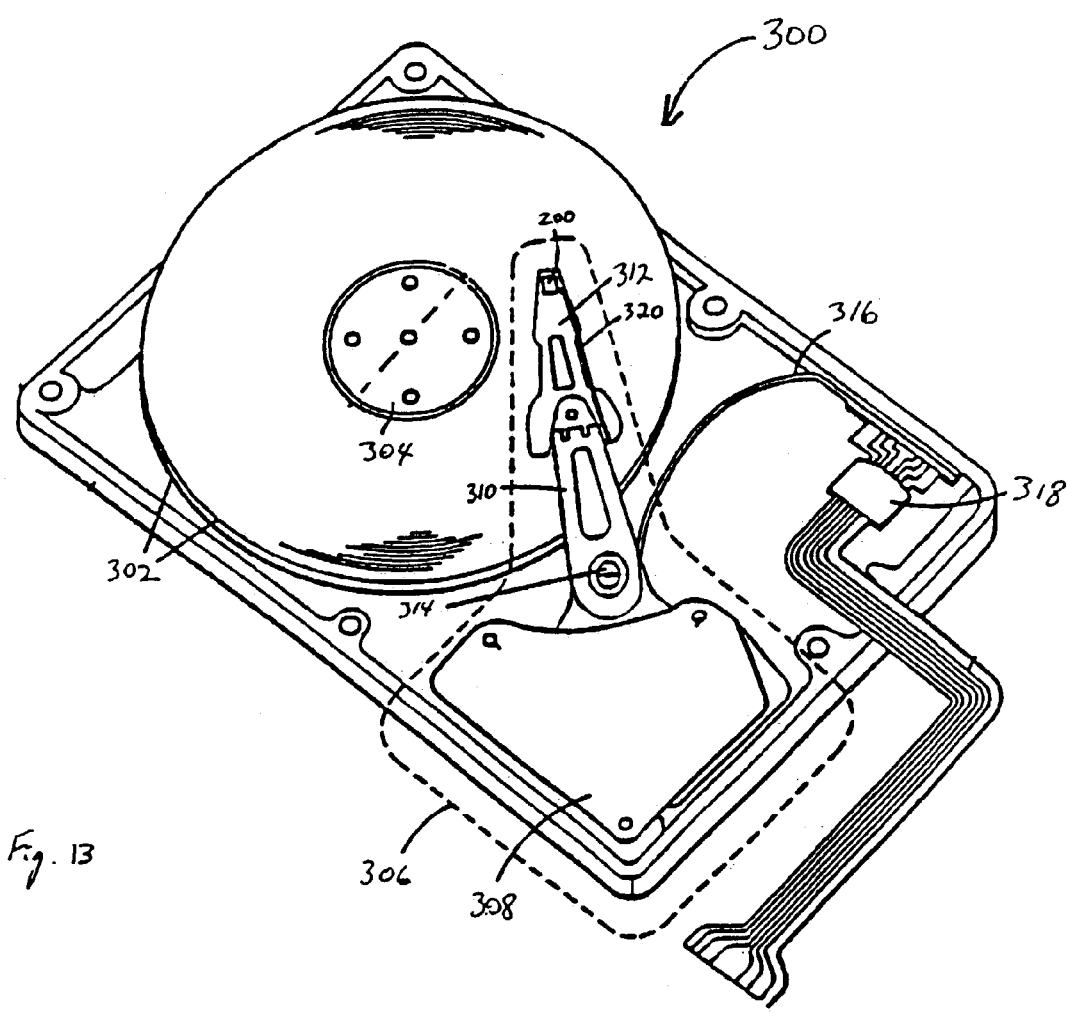
FIG. 13 is a cross-sectional view of a disk drive system according to an embodiment of the present invention.

FIG. 13 illustrates portions of a disk drive system 300 according to another embodiment of the present invention. The system includes one or more disks 302 stacked above one another. The disks 302 are capable of storing data in concentric tracks. Both sides of the disks 302 may be available for storage, and the stack may include any number of such disks 302. The disks 302 are mounted to a spindle 304. The spindle 304 is attached to a spindle motor, which rotates the spindle 304 and the disks 302 to provide read/write access to the various portions of the concentric tracks on the disks 302.

The disk drive system 300 may also include an actuator assembly 306 including voice coil motor assembly 308, which controls a head arm assembly which may include a positioner arm 310 and a suspension assembly 312. The suspension assembly 312 includes a slider 200 at its distal end. The slider 200 may be similar to the slider 200 described above and illustrated in FIGS. 9–12. Other slider structures could also be used if desired. Although only one slider 200 is shown, it will be recognized that the disk drive assembly 300 may include one or more sliders for each side of each disk 302 included in the drive. The positioner arm 310 may also include a pivot 314 around which the positioner arm 310 moves. A flexible printed circuit member 316 may carry digital signals between a chip 318 and the actuator assembly 306. One or more electrical conductors 320 are routed along the positioner arm 310 and suspension 312 to carry electrical signals to and from the read/write device and slider 200. The electrical conductors may be fabricated from a conductive material such as, for example, copper, aluminum, or alloys of these or other materials.

It will, of course, be understood that modifications of the present invention, in its various aspects, will be apparent to those skilled in the art. Other embodiments are possible, their specific features depending upon the particular application. For example, the preferred slider body material is single crystal silicon, although polycrystalline silicon or other materials could also be used. Furthermore, a variety of disk drive configurations, geometries, and components may be may be employed in disk drive systems in addition to those discussed above.

What is claimed:

1. A method for forming an air bearing surface on a slider, comprising:
    providing a silicon slider body;
    forming at least one trench in a surface of the silicon body; and
    forming a carbide structure in the at least one trench;
    wherein the carbide structure is formed by a process comprising:
        filling the trench in the silicon slider body so that with a metal carbide and anhydrous metal chloride material;
        heating the silicon slider body so that the metal carbide and anhydrous metal chloride material becomes a melt;
        after the heating the silicon slider body, cooling the silicon slider body to produce a product material from the melt; and
        removing the chloride material formed from the product material.

2. The method as in claim 1, further comprising, after the heating the silicon slider body so that the metal carbide and anhydrous metal chloride material becomes a melt, annealing the silicon slider body for a predetermined time period.

3. The method as in claim 1, wherein the removing chloride material comprises rinsing the surface of the material with at least one liquid selected from the group consisting of water and methanol to remove the chloride material.

4. The method as in claim 1, further comprising planarizing the carbide using a method selected from the group consisting of etching and polishing.

5. The method as in claim 4, further comprising etching the silicon slider body so that the carbide extends outward from the etched silicon slider body.

6. The method as in claim 1, wherein the heating the silicon slider body comprises heating the metal carbide and the anhydrous metal chloride material to a temperature of at least 450° C.

7. The method as in claim 1, further comprising forming a layer comprising titanium in the trench prior to the filling trench in silicon slider body with the metal carbide and the anhydrous metal chloride material.

8. A method for forming an air bearing surface on a slider, comprising:
    proving a silicon slider body comprising single crystal silicon;
    forming at least one trench in a surface of the silicon slider body; and
    forming a structure selected from the group consisting of a carbide structure and a nitride structure in the at least one trench; and
    forming the structure to extend to a position above the surface of the silicon slider body adjacent to the trench;
    wherein the structure comprises the carbide structure; and
    wherein the carbide structure is formed by a process comprising:
        positioning a metal carbide and an anhydrous metal chloride in the trench;
        forming a melt in the trench by heating the metal carbide and the anhydrous metal chloride material.
        after the heating, cooling the melt to yield a cooled product material; and
        removing the chloride material from the cooled product material.

9. The method as in claim 8, wherein the removing chloride material comprises rinsing the surface of the cooled product material with at least one liquid selected from the group consisting of water and methanol.

10. The method as in claim 8, wherein the heating comprises heating the metal carbide and the anhydrous metal chloride material to a temperature of at least 450° C.

11. The method as in claim 8, further comprising forming a layer comprising titanium in the trench prior to the positioning the metal carbide and the anhydrous metal chloride material in the trench.

* * * * *